US008700396B1

(12) United States Patent
Mengibar et al.

(10) Patent No.: US 8,700,396 B1
(45) Date of Patent: Apr. 15, 2014

(54) GENERATING SPEECH DATA COLLECTION PROMPTS

(71) Applicant: Google Inc., Mountain View, CA (US)

(72) Inventors: Pedro J. Moreno Mengibar, Jersey City, NJ (US); Eugene Weinstein, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/647,021

(22) Filed: Oct. 8, 2012

Related U.S. Application Data

(60) Provisional application No. 61/699,567, filed on Sep. 11, 2012.

(51) Int. Cl.
G10L 15/26 (2006.01)
G10L 21/00 (2013.01)

(52) U.S. Cl.
USPC .......................................... 704/235; 704/270

(58) Field of Classification Search
USPC ...................... 704/1–10, 231–245, 246–257, 704/258–261, 270–270.1, 276, 704/E17.001–E17.014, E15.001–E15.05, 704/E19.001–E19.049, E13.001–E13.014
See application file for complete search history.

(56) References Cited

U.S. PATENT DOCUMENTS

| 5,325,298 | A  | * | 6/1994  | Gallant  | 704/9   |
|-----------|----|---|---------|----------|---------|
| 5,339,385 | A  | * | 8/1994  | Higgins  | 704/246 |
| 5,619,709 | A  | * | 4/1997  | Caid et al. | 715/209 |
| 5,850,627 | A  | * | 12/1998 | Gould et al. | 704/231 |
| 5,918,222 | A  | * | 6/1999  | Fukui et al. | 1/1     |
| 6,006,175 | A  | * | 12/1999 | Holzrichter | 704/208 |
| 6,061,646 | A  | * | 5/2000  | Martino et al. | 704/3 |
| 6,081,774 | A  | * | 6/2000  | de Hita et al. | 704/9 |
| 6,081,780 | A  | * | 6/2000  | Lumelsky | 704/260 |
| 6,144,938 | A  | * | 11/2000 | Surace et al. | 704/257 |
| 6,167,377 | A  | * | 12/2000 | Gillick et al. | 704/240 |
| 6,243,669 | B1 | * | 6/2001  | Horiguchi et al. | 704/9 |
| 6,266,642 | B1 | * | 7/2001  | Franz et al. | 704/277 |
| 6,295,533 | B2 | * | 9/2001  | Cohen | 1/1 |
| 6,411,932 | B1 | * | 6/2002  | Molnar et al. | 704/260 |
| 6,754,626 | B2 | * | 6/2004  | Epstein | 704/235 |
| 6,766,295 | B1 | * | 7/2004  | Murveit et al. | 704/243 |
| 6,823,309 | B1 | * | 11/2004 | Kato et al. | 704/267 |
| 7,072,837 | B2 | * | 7/2006  | Kemble et al. | 704/257 |
| 7,127,403 | B1 | * | 10/2006 | Saylor et al. | 704/275 |
| 7,137,126 | B1 | * | 11/2006 | Coffman et al. | 719/328 |
| 7,177,817 | B1 | * | 2/2007  | Khosla et al. | 704/275 |

(Continued)

OTHER PUBLICATIONS

Mohri, et al. "Weighted Automata in Text and Speech Processing" ECAI 12th European Conference on Artificial Intelligence John Wiley & Sons Ltd. (1996).

(Continued)

Primary Examiner — Pierre-Louis Desir
Assistant Examiner — David Kovacek
(74) Attorney, Agent, or Firm — Fish & Richardson P.C.

(57) ABSTRACT

This document generally describes computer technologies relating to generating speech data collection prompts, such as textual scripts and/or textual scenarios. Speech data collection prompts for a particular language can be generated based on a variety of factors, including the frequency with which linguistic elements (e.g., phonemes, syllables, words, phrases) in the particular language occur in one or more corpora of textual information associated with the particular language. Textual prompts can also and/or alternatively be generated based on statistics for previously recorded speech data.

19 Claims, 4 Drawing Sheets

(56) References Cited

U.S. PATENT DOCUMENTS

| | | | |
|---|---|---|---|
| 7,359,851 B2* | 4/2008 | Tong et al. | 704/8 |
| 7,369,988 B1* | 5/2008 | Thenthiruperai et al. | 704/10 |
| 7,542,907 B2* | 6/2009 | Epstein et al. | 704/275 |
| 7,774,196 B2* | 8/2010 | Cote et al. | 704/9 |
| 7,957,969 B2* | 6/2011 | Alewine et al. | 704/254 |
| 8,131,549 B2* | 3/2012 | Teegan et al. | 704/260 |
| 8,175,879 B2* | 5/2012 | Nitisaroj et al. | 704/260 |
| 8,226,416 B2* | 7/2012 | Abrash et al. | 434/185 |
| 8,286,071 B1* | 10/2012 | Zimmerman et al. | 715/205 |
| 8,290,775 B2* | 10/2012 | Etezadi et al. | 704/260 |
| 8,340,957 B2* | 12/2012 | Gallagher et al. | 704/9 |
| 2001/0037200 A1* | 11/2001 | Ogawa et al. | 704/246 |
| 2002/0032564 A1* | 3/2002 | Ehsani et al. | 704/235 |
| 2002/0111792 A1* | 8/2002 | Cherny | 704/8 |
| 2002/0133346 A1* | 9/2002 | Kemble et al. | 704/257 |
| 2003/0028378 A1* | 2/2003 | August et al. | 704/260 |
| 2003/0144842 A1* | 7/2003 | Addison et al. | 704/260 |
| 2003/0144846 A1* | 7/2003 | Denenberg et al. | 704/277 |
| 2004/0215451 A1* | 10/2004 | Macleod | 704/231 |
| 2004/0215456 A1* | 10/2004 | Taylor | 704/235 |
| 2005/0091057 A1* | 4/2005 | Phillips et al. | 704/270.1 |
| 2005/0105712 A1* | 5/2005 | Williams et al. | 379/265.02 |
| 2005/0137868 A1* | 6/2005 | Epstein et al. | 704/252 |
| 2005/0182629 A1* | 8/2005 | Coorman et al. | 704/266 |
| 2006/0025997 A1* | 2/2006 | Law et al. | 704/257 |
| 2006/0074670 A1* | 4/2006 | Weng et al. | 704/257 |
| 2006/0116877 A1* | 6/2006 | Pickering et al. | 704/231 |
| 2006/0161423 A1* | 7/2006 | Scott et al. | 704/10 |
| 2006/0287846 A1* | 12/2006 | Ollason | 704/4 |
| 2007/0055523 A1* | 3/2007 | Yang | 704/257 |
| 2009/0006097 A1* | 1/2009 | Etezadi et al. | 704/260 |
| 2009/0048838 A1* | 2/2009 | Campbell et al. | 704/254 |
| 2009/0171662 A1* | 7/2009 | Huang et al. | 704/251 |
| 2010/0004931 A1* | 1/2010 | Ma et al. | 704/244 |
| 2010/0145694 A1* | 6/2010 | Ju et al. | 704/235 |
| 2010/0161327 A1* | 6/2010 | Chandra et al. | 704/235 |
| 2011/0224972 A1* | 9/2011 | Millett et al. | 704/9 |
| 2011/0307241 A1* | 12/2011 | Waibel et al. | 704/2 |
| 2012/0016671 A1* | 1/2012 | Jaggi et al. | 704/235 |
| 2012/0191457 A1* | 7/2012 | Minnis et al. | 704/260 |
| 2012/0232901 A1* | 9/2012 | Kadirkamanathan et al. | 704/240 |
| 2012/0278061 A1* | 11/2012 | Weinstein et al. | 704/2 |

OTHER PUBLICATIONS

Nelken, et al. "Computing the Kullback-Leibler Divergence Between Probabilistic Automata Using Rational Kernels" *Division of Engineering and Applied Sciences Harvard University* Cambridge MA 02138 (Mar. 3, 2006).

Mohri, "Weighted Automata Algorithms" *Courant Institute of Mathematical Sciences* 251 Mercer Street, New York, NY 10012, *Google Research* 76 Ninth Avenue, New York, NY 10011, 1996.

* cited by examiner

GENERATING SPEECH DATA COLLECTION PROMPTS

CROSS-REFERENCE TO RELATED APPLICATIONS

This application claims priority under 35 U.S.C. §119(e)(1), to U.S. Provisional Application Ser. No. 61/699,567, filed on Sep. 11, 2012, the entire contents of which are incorporated herein.

BACKGROUND

Acoustic models have been used to transcribe speech data (e.g., digital voice recordings), such as generating textual transcripts of voicemail messages. Acoustic models can map linguistic features, such as phonemes (smallest unit of sound used for identifying meaningful contrasts between utterances in a spoken language), to utterances in speech data. To generate (or train) an acoustic model for transcribing audio data in a particular language, training data in the particular language can be used. Training data can include speech data (e.g., speech samples) and textual transcripts that map particular portions of the speech data to text (e.g., words, portions of words). Speech data collection prompts, such as scripts and/or scenarios, have been manually generated and provided to users to read aloud to generate training data.

SUMMARY

This document generally describes computer technologies relating to generating speech data collection prompts, such as textual scripts and/or textual scenarios. Textual scripts can include complete textual passages (e.g., phrases, sentences, paragraphs) that are intended to be read aloud and verbatim by a speaker for generating speech data. Textual scenarios can include partial textual passages (e.g., words, concepts, descriptions of actions and actors) that provide some details regarding a scenario and, based on other details that have been omitted, cause a speaker to ad lib at least a portion of the speech data that is generated therefrom.

For example, a textual script can be the following sentence which a user would read aloud and which would be digitally recorded possibly for use training an acoustic model: "I am interested in travelling from Chicago, Ill. to New York, N.Y. by this Friday. What flights are available for under $300?" A textual scenario, in contrast, may specify some of these details to a user but leave the phrasing and sentence structure up to the user. For instance, the following may be a textual scenario that would be provided to a user for generating speech data: "request flight information; Chicago, Ill. to New York, N.Y.; Friday travel; $300 budget." Such a scenario can allow a user to use phrasing that is more natural to the particular user, as opposed to the imposed phrasing in a script.

Speech data collection prompts for a particular language can be generated based on a variety of factors, including the frequency with which linguistic elements (e.g., phonemes, syllables, words, phrases) in the particular language occur in one or more corpora of textual information associated with the particular language. For example, a frequency with which words in English occur in a corpus of electronic documents (e.g., web pages) in English can be used to identify words to include in textual prompts to be provided to users for generating training data for the particular language. Textual prompts can also and/or alternatively be generated based on statistics for previously recorded speech data. For example, if no previously recorded speech samples include the combination of phonemes /ʌ/, /m/, and /ɪ/, then a word including such a combination of phonemes, like "hummingbird," may be selected for inclusion in a textual prompt. As described in greater detail below, other factors can also and/or alternatively be used to generate textual prompts.

In one implementation, a computer-implemented method includes receiving, at a computer system, a request to generate a textual prompt to provide to a user for generating speech data in a particular language; in response to receiving the request, determining frequencies of occurrence of linguistic features of the particular language in one or more corpora that are associated with the particular language, wherein the one or more corpora include content that was generated by people who use the particular language and that reflects current use of the particular language; identifying, by the computer system, quantities of speech samples that include the linguistic features from a repository of previously recorded speech samples; weighting the frequencies of occurrence of the linguistic features based on the quantities of speech samples that include the linguistic features, wherein the weighting generates weighted frequencies for the linguistic features; generating, by the computer system, one or more textual prompts based on the weighted frequencies for the linguistic features, wherein each of the one or more textual prompts comprises a combination of two or more of the linguistic features; and providing, by the computer system, the generated one or more textual prompts.

This and other implementations described herein can optionally include one or more of the following features. The request can identify a particular user to whom the request pertains, and the method can further include identifying, by the computer system, one or more characteristics of the particular user's voice from a speech sample for the particular user; and selecting, from the repository of previously recorded speech samples, a subset of the previously recorded speech samples that include voices that have one or more characteristics that match, within a threshold value, the one or more characteristics of the particular user's voice; where the quantities of speech samples are identified from the subset of the repository of previously recorded speech samples. The one or more characteristics of the particular user's voice can include one or more of: a pitch of the particular user's voice, a vocal tract length of the particular user's voice, an accent of the particular user with which the particular user speaks, and a cadence with which the particular user speaks. The generated one or more textual prompts can be provided to a computing device that is associated with the particular user.

The request can identify a particular acoustic environment to which the request pertains, and the method can further include selecting, from the repository of previously recorded speech samples, a subset of the previously recorded speech samples that were recorded in acoustic environments that match, within a threshold value, the particular acoustic environment; where the quantities of speech samples can be identified from the subset of the repository of previously recorded speech samples. The particular acoustic environment can include a mobile telephone device into which a user is speaking and from which audio signals are being received. For a first linguistic feature that i) has a same or greater frequency of occurrence in the one or more corpora as a second linguistic feature and ii) has lesser quantity of speech samples in the repository of previously recorded speech samples than a quantity of speech samples for the second linguistic feature, the first linguistic feature can be determined to have a weighted frequency that is greater than a weighted frequency for the second linguistic feature. Tor a first linguistic feature that i) has a greater frequency of occurrence in the one or more corpora as a second linguistic feature and ii) has a same or lesser quantity of speech samples in the repository of previously recorded speech samples than a quantity of speech samples for the second linguistic feature, the first linguistic feature can be determined to have a weighted frequency that is greater than a weighted frequency for the second linguistic feature.

Generating the one or more textual prompts can include repeatedly performing the following until the one or more textual prompts have been generated: selecting a combination of candidate linguistic features from the linguistic features based on the weighted frequencies; and grammar checking and spell checking the combination of candidate linguistic features, wherein the combination of candidate linguistic features is identified as one of the one or more textual prompts when the combination of candidate linguistic features passes the grammar checking and the spell checking. The combination of candidate linguistic features can be selected based on the candidate linguistic features having weighted frequencies that are at a threshold level or greater. The combination of candidate linguistic features can be selected based on the candidate linguistic features having weighted frequencies that are greatest among the weighted frequencies for the linguistic features that have not yet been considered in combination together. The linguistic features can include one or more of: phonemes, syllables, words, and phrases. The one or more textual prompts can include one or more textual scripts that are generated for users to read aloud without modification when providing a speech sample. The one or more textual prompts can include one or more scenarios that include incomplete information regarding the one or more scenarios so that users providing speech samples from the one or more scenarios ad lib at least a portion of the speech samples. The one or more corpora can include, at least, a corpus of search query logs that include user-generated search queries in the particular language. The one or more corpora can include, at least, a corpus of electronic documents that include text in the particular language. The one or more corpora can include, at least, a corpus of user-generated textual content on one or more social networks, the user-generated textual content being in the particular language.

In another implementation, a computer system includes one or more computing devices; an interface of the one or more computing devices that is programmed to receive requests to generate a textual prompt to provide to a user for generating speech data in a particular language; one or more corpora that are accessible to the one or more computing devices and that include content that was generated by people who use the particular language and that reflects current use of the particular language; a frequency module that is installed on the one or more computing devices and that is programmed to determine frequencies of occurrence of linguistic features of the particular language in the one or more corpora; a repository of previously recorded speech samples that are accessible to the one or more computing devices; a quantity module that is installed on the one or more computing devices and that is programmed to identify quantities of speech samples that include the linguistic features from the repository of previously recorded speech samples; a weighting module that is installed on the one or more computing devices and that is programmed to weight the frequencies of occurrence of the linguistic features based on the quantities of speech samples that include the linguistic features, wherein the weighting generates weighted frequencies for the linguistic features; and a textual prompt generator that is installed on the one or more computing devices and that is programmed to generate one or more textual prompts based on the weighted frequencies for the linguistic features, wherein each of the one or more textual prompts comprises a combination of two or more of the linguistic features.

Such a computer system can optionally include one or more of the following features. For a first linguistic feature that i) has a same or greater frequency of occurrence in the one or more corpora as a second linguistic feature and ii) has lesser quantity of speech samples in the repository of previously recorded speech samples than a quantity of speech samples for the second linguistic feature, the first linguistic feature can be determined to have a weighted frequency that is greater than a weighted frequency for the second linguistic feature.

In another implementation, a computer program product embodied in a computer-readable storage device storing instructions that, when executed, cause a computer system with one or more processors to perform operations including receiving a request to generate a textual prompt to provide to a user for generating speech data in a particular language; in response to receiving the request, determining frequencies of occurrence of linguistic features of the particular language in one or more corpora that are associated with the particular language, wherein the one or more corpora include content that was generated by people who use the particular language and that reflects current use of the particular language; identifying quantities of speech samples from a repository of previously recorded speech samples that include the linguistic features; weighting the frequencies of occurrence of the linguistic features based on the quantities of speech samples that include the linguistic features, wherein the weighting generates weighted frequencies for the linguistic features; generating one or more textual prompts based on the weighted frequencies for the linguistic features, wherein each of the one or more textual prompts comprises a combination of two or more of the linguistic features; and providing the generated one or more textual prompts.

The details of one or more embodiments are set forth in the accompanying drawings and the description below. Various advantages can be provided. For example, textual prompts and training data for acoustic models can be generated more efficiently and cheaply. Previously, textual prompts have been manually generated, which can be an expensive and time consuming and expensive endeavor. By automatically generating textual prompts based on a variety of available information, such as corpora that include textual information that indicates current language usage, textual prompts that accurately track current language trends can be more quickly and cheaply produced.

In another example, textual prompts can be produced to adapt to changes in language without having to specifically identify such changes, which may be subtle and difficult to identify over shorter periods time (e.g., over a year or two). By generating textual prompts based on frequency analysis of recent texts generated by users, such as content posted to social networks and/or published in electronic documents, textual prompts can be generated that reflect current language usage without having to specifically identify language trends.

In another example, textual prompts can be dynamically generated to adjust to current needs in training data sets. For instance, if there is a large quantity of speech samples where users say the word "school" but few speech samples where users say the word "college," textual prompts can be generated to include the word "college" so that more speech samples can be generated to include the word "college." Accordingly, an acoustic model being trained on training data that is being generated from such dynamically produced textual prompts can be improved.

In another example, phrases and/or topics can be dynamically identified and used to generate audio data. For example, web-accessible content can be mined to locate phrases that contain the word "school" and/or to locate content (e.g., documents, text fragments) whose topicality is similar to "school." From such identified content, textual prompts can be dynamically generated and provided to users to generate audio data.

Other features, objects, and advantages will be apparent from the description and drawings, and/or from the claims.

BRIEF DESCRIPTION OF THE DRAWINGS

Like reference numbers and designations in the various drawings indicate like elements.

DETAILED DESCRIPTION

Figure 1:
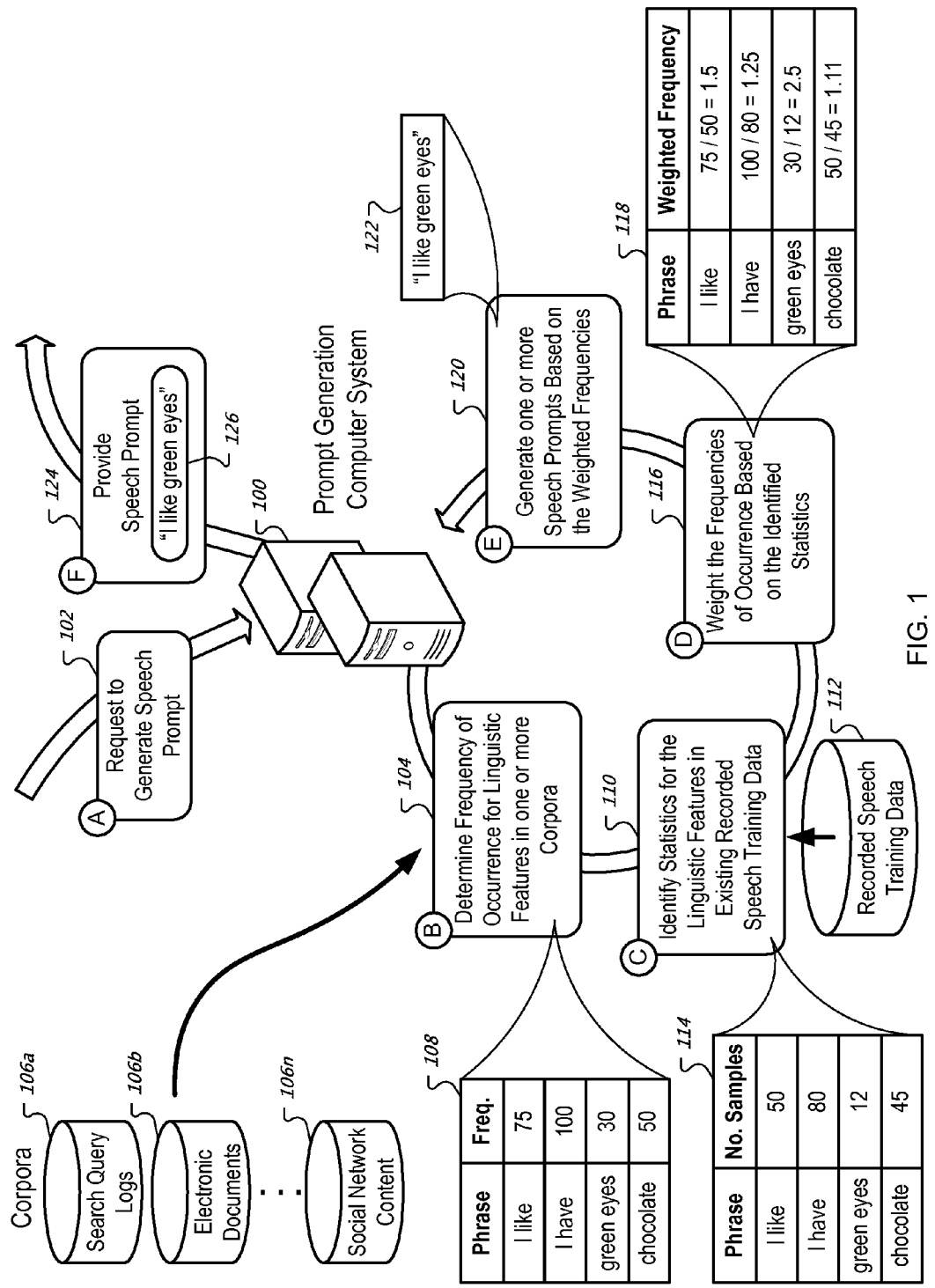
FIG. 1 depicts a conceptual diagram of an example prompt generation computer system.

This document generally describes techniques for generating textual prompts to be used to create speech data, such as a corpus that includes diverse training data for a particular language. For example, a corpus of speech data recorded from a diverse group of speakers can be used as training data for generating an acoustic model in a particular language (e.g., English, French, German, Spanish). To generate such a corpus of speech data, textual prompts (e.g., scripts and/or scenarios) that serve as guides for speakers providing speech samples can be created and provided to a diverse group of speakers for recordation and subsequent use in training an acoustic model. For example, a group of diverse speakers (e.g., speakers with varied pitch, accent, age, and gender) can be provided with varied scenarios and/or scripts to read as sample voicemail messages. Such simulated voicemail messages and the corresponding textual transcripts can serve as a corpus of training data for an acoustic model.

For example, users can be provided with example scenarios that indicate general themes for simulated voicemail messages, but users can be instructed to improvise the exact wording of the messages so as to generate diverse messages. For instance, a user can be provided with the following as an example scenario: "You are returning a call to a company that services your photocopier. Leave the name of the account manager, your name and your client number." A variety of sample speakers can be used to obtain sufficient diversity of individual characteristics (e.g., pitch, vocal tract length, gender, age, accent) as well as acoustic environments, such as messages recorded over cell phone and land line channels. With scenario-based voicemail generation, example voicemails can be manually segmented and transcribed. Such a segmentation process can be used to remove long silence periods as well as provide time-alignment information to bootstrap training algorithms. Additionally, such a transcription process can be used to produce high-quality transcripts that can reduce post-processing.

To create diversity in speech data used to generate an acoustic model, scripts and/or scenarios can be generated for users based on the frequency with which linguistic features (e.g., words, phrases, topics, parts of speech, phonemes) are used by people within a particular language. For example, if speakers of U.S. English use the phrase "rotate counter-clockwise" more frequently than the phrase "rotate anti-clockwise," which is used predominantly by U.K. English speakers, the phrase "rotate counter-clockwise" can be provided to U.S. English speakers to obtain training data for phrases that are likely to be uttered by U.S. English speakers. The frequency with which parts of a particular language are used by speakers in the particular language can be determined using one or more corpora associated with the particular language, such as works of prose in the particular language (e.g., news articles, fictional works, non-fictional works), social network posts by people from and/or physical located in a geographic region (e.g., country, state, county, city) associated with the particular language, transcripts of speakers in the particular language (e.g., media transcripts, courtroom transcripts, transcripts of speeches), and/or other appropriate sources of language generation by speakers in a particular language.

For example, if the phrases "I like to shop" and "for clothing" are frequently used by people in a particular language, they can be combined to generate a script "I like to shop for clothing." Such a script can be provided to a diverse group of speakers in a variety of different acoustic environments so as to obtain diverse speech data in the particular language for the phrase. Such diversity of speech data can be used to generate accurate acoustic models for a particular language.

When identifying linguistic features (e.g., words, phrases, parts of speech, phonemes) for script and/or scenario generation, training data that has collected thus far can be analyzed to identify portions of a particular language for which there is less than a threshold amount of training data. For instance, frequency-based generation of scripts for a particular language may leave some holes in the particular language, such as combinations of words, phrases, and/or phonemes that do not occur in the scripts at least a threshold number of times. Statistics for the training data can be used to identify such holes and can be used to adjust generation of scripts and/or scenarios. For instance, the frequency with which linguistic features occur in one or more corpora for a particular language can be weighted based on statistics for the linguistic features in previously recorded training data for the particular language, such as quantities of previously recorded speech samples that include the linguistic features, characteristics of voices of the speakers (e.g., pitch, vocal tract length, cadence, accent) who provided the previously recorded speech samples, and/or ages associated with the previously recorded speech samples (e.g., recorded one month ago, recorded 5 years ago, recorded 20 years ago).

For example, if the phrase "I like sports" has a greater frequency in one or more corpora for a particular language than the phrase "I like stamps," the phrase "I like sports" may be selected for inclusion in a script and/or scenario that will be provided to a speaker for generation of training data (e.g., audio recording with corresponding textual transcript). However, if the training data already includes speech samples for the phrase (or portions thereof) "I like sports" from several different speakers in varied acoustic environments but there is little training data regarding the phrase (or portions thereof) "I like stamps," the phrase "I like stamps" can be weighted more heavily than the phrase "I like sports" and, as a result, may be selected for inclusion in a script and/or scenario.

In another example, the frequency with which combinations of phonemes occur in training data for a particular language can be used to weight parts of the particular language (e.g., words, phrases, parts of speech). For instance, if the combination of phonemes /aa/ and /z/ (e.g., in the word "azure") occurs in training data collected for a particular language with less than a threshold frequency, then words and phrases that include that combination of phonemes (e.g., "azure," "Azerbaijan") can be weighted more heavily than other words and phrases with phonemes that occur more frequently in the training data. As discussed above, the weighting can affect which word and/or phrases are selected for inclusion in a script and/or scenario provided to a speaker.

Scripts and/or scenarios can additionally be generated based on characteristics of a particular speaker and/or the particular speaker's voice (e.g., pitch, accent, age, gender, speech cadence). For instance, if a first speaker has a low pitched voice, scripts and/or scenarios can be generated for the first speaker for portions of a particular language for which there exists less than a threshold amount of training data from other speakers with similar low pitched voices. However, different scripts and/or scenarios can be generated for a second speaker with a high pitched voice based, at least in part, on the distribution of training data from other speakers with similarly pitched voices. Similar to the weight discussed above, weights can be applied to text within a particular language based on an individual speaker's characteristics and/or the distribution of training data in the particular language from other similar speakers.

Weights can additionally be applied to text in a particular language for script and/or scenario generation based, at least in part, on the age of the text. Languages are dynamic with ever changing vocabularies and syntax. For instance, Shakespearean English is quite different than present day English. Text that is serving as a source for generating scripts and/or scenarios for creating training data for a particular language can be weighted based on how likely the text represents current speakers in the particular language. For instance, a textual transcript for a first speech a couple days ago can have a greater weight than a textual transcript of a second speech that took place in 1920—the first speech can be a more accurately model the form of the particular language that is likely to be encountered by a speech recognition system than the second speech. Weights can be determined based on an age associated with text and can be applied when determining the frequency with which portion of a particular language are used by speakers of the particular language. For instance, the number of times that words and/or phrases occur in the example first speech can be multiplied by a weighting factor (e.g., 1.1, 1.2, 1.5) to make their occurrence more significant than the occurrence of words and/or phrases in the second speech.

FIG. 1 depicts a conceptual diagram of an example prompt generation computer system 100 that is configured to generate textual prompts for one or more languages. In the depicted example, the prompt generation computer system 100 receives a request to generate a speech prompt in a particular language.

The prompt generation computer system 100 can be any of a variety of appropriate computing devices, such as a laptop computer, a desktop computer, a distributed server system (e.g., a cloud computing system), or any combination thereof. As indicated by step A (102), the prompt generation computer system 100 receives an electronic request to generate a speech prompt. The electronic request can be received by the prompt generation computer system 100 through any of a variety of communications channels, such as the Internet, a local area network (LAN), a wide area network (WAN), a virtual private network (VPN), a wireless network (e.g., wifi, cellular telephone network, 3G/4G data network, etc.), or any combination thereof.

Although not depicted, the request can be provided to the prompt generation computer system 100 by any of a variety of other computing devices, such as another computer server system, a mobile telephone, a smartphone, a tablet computing device, a desktop computer, or any combination thereof. Such a computing device may have previously received an electronic document (e.g., a web page) and/or an application (e.g., application for recording speech samples from users) through which the request was generated by a user of the other computing device. For example, another computing device may be running an application that displays speech prompts to and records speech samples from a user of the computing device. Such a computing device can provide a request for one or more speech prompts to the prompt generation computer system 100 over one or more networks. Such a computing device may include information that identifies characteristics of the user's voice (e.g., pitch, vocal tract length, accent) and/or may include a speech sample from which the prompt generation computer system 100 can derive such information.

As indicated by step B (104), the prompt generation computer system 100 determines the frequency of occurrence of linguistic features (e.g., words, phrases, parts of speech, phonemes) in one or more corpora 106a-n. The corpora 106a-n can include information that, with or without further analysis, indicates how linguistic features are used in various languages. The example corpora 106a-n are depicted as including search query logs 106a, electronic documents 106b, and social network content 106n. The information accessed from the corpora 106a-n can be anonymized, so as to protect user privacy.

The search query logs 106a include records of search queries that have been submitted by users to computer systems, such as search engines. Given that search queries are often times concise, examining search query logs can indicate which words users gravitate towards and/or select as the best way to convey a concept or an idea that in which they are interested. For instance, English language users may more frequently submit search queries with the word "car" than with the word "automobile." The greater frequency of "car" in the search query logs 106a can provide an indication of the local preference of English language users with regard to "car" as opposed to "automobile." By using the search query logs 106a, such localized preferences can be organically identified and changes in such preferences over time can be automatically identified by continually updating the search query logs 106a with recent user search queries.

A variety of information can be included/associated with the search query logs 106a, such as a language associated with the search query (e.g., language used by a user's computing device), a timestamp for the search query, and/or a geographic region (e.g., continent, country, state, city, etc.) from which the search query was received. Search query logs can be generated by the computer systems that receive search queries. The prompt generation computer system 100 can be provided with access to the search query logs 106a, which can be organized using various data structures, such as indices and/or hash tables.

When determining the frequency of linguistic features in the search query logs 106a, the search query logs that are examined from the corpus can be narrowed down to search queries that meet various criteria, such as associated language, geographic region of origin, and/or a timeframe within which the search query was received. For instance, if the request to generate a speech prompt specifies that speech prompts should be generated for UK English, the prompt generation computer system 100 can use a subset of the queries from the search query logs 106a that are in English and that were received from users in the UK. The prompt generation computer system 100 may also restrict the timeframe for the search query logs that are used. For instance, the prompt generation computer system 100 can restrict the search query logs to those received within the last hour, day, month, year, 5 years, decade, etc.

The electronic documents corpus 106b can include information regarding electronic documents (e.g., web pages). For instance, the electronic document corpus 106b can include an index of linguistic features used in various electronic documents and information associated with electronic documents (e.g., language, web address, timestamp). Like the search query logs 106a, the electronic documents corpus 106b can provide an indication of how linguistic features are used by users of a particular language and/or within a particular geographic region. For instance, if users creating web pages more frequently use the word "car" than "automobile," such a difference in frequency can provide an indication that users prefer "car" over "automobile." The electronic documents corpus 106b can be created and maintained by an associated computer system (e.g., a search engine, a web crawler engine) and the prompt generation computer system 100 can be provided with access to the corpus 106b for at least frequency analysis.

The social network content corpus 106n can include content (e.g., comments, posts, profile information, etc.) generated by users on a social network (e.g., FACEBOOK, TWITTER, LINKEDIN, YOUTUBE, etc.). Similar to the search query logs and electronic documents discussed above, content generated by users of a social network can indicate how linguistic features are used and what linguistic features mean within a particular language. The social network content corpus 106n can include a variety of additional information that can be used by the prompt generation computer system 100 when analyzing the frequency of linguistic features in the corpus 106n, such as languages associated with social network content, a geographic region from which the content originated, and/or a timestamp for the content. The social network content corpus 106n can be populated and maintained by a corresponding social network computer system, and the prompt generation computer system 100 can be provided access to the corpus 106n. The social network content contained in the corpus 106n, like the information contained in the other corpora 106a and 106b, can be anonymized so as to protect user privacy.

Various other corpora not depicted or described in FIG. 1 can also be referenced by the prompt generation computer system 100.

The prompt generation computer system 100 can determine the frequency of occurrence of linguistic features in one or more of the corpora 106a-n (104). An example table 108 provides example frequencies of occurrence for phrases (example linguistic feature) "I like," "I have," "green eyes," and "chocolate" in one or more of the corpora 106a-n. As depicted in the table 108, the phrase "I have" has the greatest frequency with 100 occurrences. The example phrases and frequencies in table 108 are simplified to illustrate the features of the prompt generation computer system 100. Although phrases (example linguistic feature) are depicted in the table 108, frequencies of occurrence in the corpora 106a-n can additionally and/or alternatively be determined for other linguistic features, such as words, syllables, and/or phonemes.

An occurrence can be counted in a variety of ways by the prompt generation computer system 100. For instance, an occurrence can be the number of documents and/or search queries within which a linguistic feature appears, or it can be the number of times the linguistic feature appears (including multiples occurrences within the same document and/or search query). Occurrences can be determined using a variety of data formats, such as a tally (as depicted in table 118), as a percentage, and/or as aggregated levels of occurrence (e.g., high frequency, medium frequency, low frequency).

The prompt generation computer system 100 can identify statistics for the linguistic features in existing recorded speech training data 112, as indicated by step C (110). The recorded speech training data 112 can include various previously recorded speech samples that are paired with corresponding textual transcripts, from which acoustic models can be trained. The recorded speech training data 112 can be accessed by the prompt generation computer system 100 to identify statistics regarding the previously recorded speech data, such as a number of previously recorded speech samples that have been recorded for each linguistic feature, voice characteristics (e.g., pitch, vocal tract length, accent, age, gender) of speakers from whom speech samples were recorded for each linguistic feature, and/or acoustic environments from which speech samples were recorded for each linguistic feature (e.g., recorded over a cell phone connection, recorded in an area with low/medium/high levels of background noise). The identified statistics can be used by the prompt generation computer system 100 to identify linguistic features for which additional recorded speech samples may be needed (e.g., linguistic features for which there is little, if any, speech data in the recorded speech training data 112) and/or to identify linguistic features for which additional recorded speech samples may not be needed (e.g., e.g., linguistic features for which there already a diverse collection of speech data in the recorded speech training data 112).

Table 114 depicts example statistics for the linguistic features from the table 108. In the table 114, the example statistic that is listed is a number of speech samples for each of the linguistic features. For instance, there are 80 recorded speech samples that include the phrase "I have" in the recorded speech training data 112, there are 50 recorded speech samples that include the phrase "I like" in the recorded speech training data 112, there are 45 recorded speech samples that include the phrase "chocolate" in the recorded speech training data 112, and there are 12 recorded speech samples that include the phrase "green eyes" in the recorded speech training data 112. The prompt generation computer system 100 can alternatively and/or additionally use other statistics from the recorded speech training data 112 for generating textual prompts, such as statistics identifying characteristics of speakers who have provided speech samples for various linguistic features and/or acoustic environments in which the speech samples have been recorded.

The prompt generation computer system 100 can weight the frequencies of occurrence based on the identified statistics for the linguistic features, as indicated by step D (116). By weighting the frequencies of occurrence, the prompt generation computer system 100 can combine information that indicates current uses of a particular language (frequency of occurrence for linguistic features) with information that indicates current needs for recorded speech samples in the particular language (statistics from the recorded speech training data 112 for linguistic features) to identify linguistic features that should be selected for inclusion in a speech prompt. Such combination can attempt to strike a balance between current language use and current recorded speech needs. For instance, if only frequency of occurrence in the corpora 106a-n were used to generate speech prompts then the resulting recorded speech training data 112 may lack diversity and an acoustic model trained therefrom may be incomplete. In contrast, if only statistics from the recorded speech training data 112 were used to generate speech prompts then the resulting speech the resulting recorded speech training data 112 may include diverse speech data but lack a sufficient quantity of recorded speech samples for commonly occurring linguistic features so as to adequately train an acoustic model to recognize such features. By combining frequency of occurrence information and statistics for the previously recorded speech training data 112, the prompt generation computer system 100 can generate speech prompts that will result in recorded speech training data that has sufficient coverage for commonly occurring linguistic features and that has sufficient diversity for a resulting acoustic model to be complete.

Any of a variety of appropriate techniques can be used to weight the frequencies of occurrence, such as dividing the frequencies of occurrence by the statistics for the recorded speech training data 112 (e.g., dividing the frequencies of occurrence by the number of speech samples), dividing the frequencies of occurrence by a function of the statistics for the recorded speech training data 112 (e.g., dividing the frequencies of occurrence by a log of the number of speech samples, dividing the frequencies of occurrence by the number of speech samples squared), and/or multiplying the frequencies of occurrence by predetermined factors that are selected based on the statistics for the recorded speech training data 112 (e.g., multiply by a factor 1.5 when the number of speech samples is less than 10, by a factor of 1.4 when the number of speech samples are between 10 and 25, by a factor of 1.3 when the number of speech samples are between 26 and 50, and so on). As depicted in the example table 118, the frequencies of occurrence for the four example phrases are divided by the number of speech samples for each of the example phrases. The resulting weighted frequencies for the phrases are 2.5 for the phrase "green eyes," 1.5 for the phrase "I like," 1.25 for the phrase "I have," and 1.11 for the phrase "chocolate."

In another example, techniques for identifying recordings that are most needed can include comparing language models for the text corpora and the transcripts of speech samples that have already been recorded. For instance, a first n-gram language model can be trained on the text corpora and a second n-gram language model can be trained on the transcripts of previously recorded speech samples. The first n-gram language model and the second n-gram language model could then be analyzed to determine where the language models diverge, with the divergence being the portion of the language for which additional recorded speech samples are needed. Such a technique may provide a more accurate indication of needed speech samples based on the language models taking into account sequences of linguistic features as they occur in the text corpora and in the previously recorded speech samples.

For example, if the text corpora frequently mention the phrase "I like chocolate" and the already-recorded speech samples include a lot of utterances that for "I like" and "chocolate" separately, but no samples for the phrase "I like chocolate," the separate utterances provide a fair estimate for the phrase but are not as good as samples for the entire phrase "I like chocolate." Using n-gram language models for the text corpora and transcripts of the previously recorded speech samples, a back-off (or smoothing) procedure can be used to try to first match n-grams in descending order from highest order n-grams, such as the trigram "I like chocolate," to the lowest order n-grams, such as the unigram "chocolate." For instance, if the highest order n-gram "I like chocolate" does not match, the procedure can "back-off" to a sequence of lower-order n-grams, such as the bigram "I like" and the unigram "chocolate." Any time the model takes a back-off, the resulting probability (or score) that a sequence of linguistic elements, such as the phrase "I like chocolate," is accurately modeled and represented in the previously recorded speech samples can be reduced. So this naturally introduces a penalty for having pieces of the string but not the entire sequence and order of the words in the string in the model. Combinations of linguistic features with low probabilities (or scores) can be determined to likely have a poor representation in the previously recorded speech samples and can, accordingly, identified for inclusion in textual prompts.

Such probabilities can be determined using any of a variety of appropriate techniques. For example, in one possible technique two n-gram language models can be made available, one for text corpora and one for speech recordings, and can be represented with finite-state automata T and S, respectively. The weights in one of the models, such as S, can be negated and the model with negated weights can be represented as −S. The automata in the log semiring can be composed to get automaton C (C=To (−S)). The resulting automaton |C| is such that for each word sequence x, the weight assigned by C to x is high if there is a large divergence in probabilities assigned to x by T and S. In numerical terms, $C(x)=\log [T(x)/S(x)]=\log [T(x)]-\log [S(x)]$. The resulting automata from C(x) can be composed with T(x) again in the probability semiring to get the Kullback-Liebler (KL) divergence between the two language models.

As indicated by step E (120), the prompt generation computer system 100 can generate one or more speech prompts (e.g., scripts, scenarios) from the linguistic features based on the weighted frequencies for the linguistic features. The prompt generation computer system 100 can select combinations of the linguistic features having the greatest weighted frequencies as candidate speech prompts and can evaluate the candidate speech prompts using grammar checkers and/or spell checkers. In some implementations, the combinations of linguistic features can be generated using reference information to guide the assembly of linguistic features, such as syllable and phonemes, into words in the particular language and into more complex grammatical units, such as phrases, sentences, and paragraphs. Such reference information can include any of a variety of appropriate sources, such as dictionaries, the one or more corpora 106a-n, and transcripts from the recorded speech training data 112.

In the depicted example, the linguistic elements with the greatest weighted frequencies of occurrence, the phrase "green eyes" with a weighted frequency of 2.5 and the phrase "I like" with a weighted frequency of 1.5, are combined to generate a textual speech prompt "I like green eyes" (122).

As indicated by step F (124), the prompt generation computer system 100 provides the speech prompt 122 in response to receiving the request to generate speech prompts. The speech prompt 122 can be provided to the computing device from which the request for a speech prompt was received and can be provided alone or in combination with an electronic document, such as a web page. For instance, the prompt generation computer system 100 can serve a web page that provides the speech prompt as a result to a request from a user. Such a web page can be provided in any of a variety of electronic data formats, such as HTML, extensible markup language (XML), SHOCKWAVE/FLASH, JAVASCRIPT, and/or HTML5.

Figure 2:
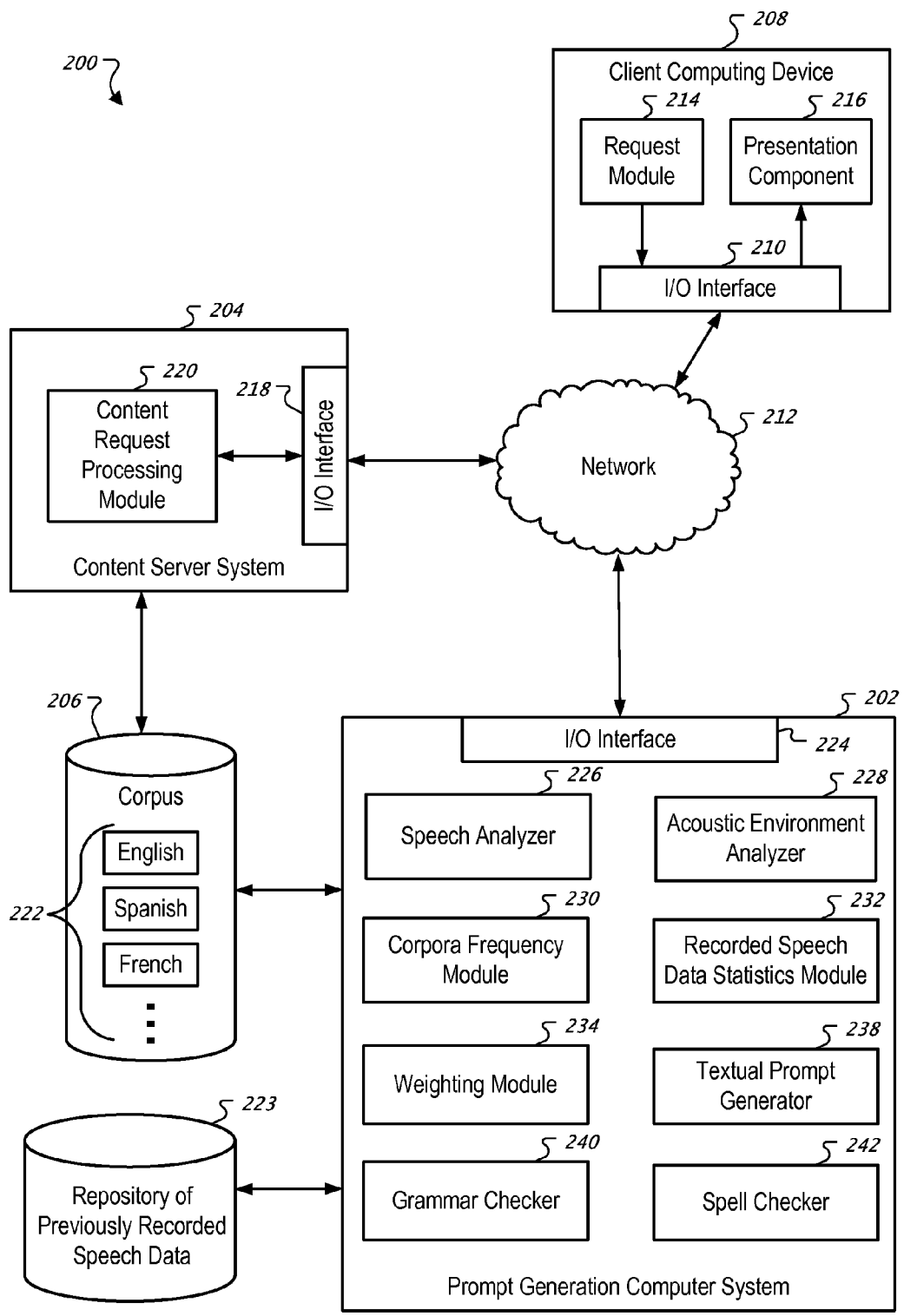
FIG. 2 depicts an example system for generating speech prompts.

FIG. 2 depicts an example system 200 for generating speech prompts. The system 200 includes a prompt generation computer system 202 that is configured to generate speech prompts. The system 200 also includes a content server system 204 that provides content to users and, as part of the content serving, generates/maintains a corpus 206 that the prompt generation computer system 202 can use for speech prompt generation. The example system 200 is also depicted as including a client computing device 208 that can interact with the prompt generation computer system 202 (e.g., to request speech prompts) and/or with the content server system 204 (e.g., to request content). The prompt generation computer system 202 can be similar to the prompt generation computer system 100 described above with regard to FIG. 1.

The client computing device 208 can be any of a variety of computing devices, such as a laptop computer, a desktop computer, a netbook, a mobile telephone, a smartphone, a tablet computing device, and/or a computer server system. The client computing device 208 includes an input/output (I/O) interface 210 that the device 208 uses to communicate with other computing devices over a network 212. The I/O interface 210 can be any of a variety of communications interfaces, such as an Ethernet card, a wireless network card, a cellular network transceiver, or any combination thereof. The client computing device 208 includes a request module 214 that is configured to provide requests for content to the content server system 204 and/or for speech prompts to the prompt generation computer system 202 over the network 212. The request module 214 can be configured to make such requests in response to user input, such as a user selecting a link and/or button provided by an electronic document (e.g., web page). The client computing device 208 can also include a presentation module 216 that is configured to provide (e.g., display, audibly output, etc.) content and/or speech prompts received from the content server system 204 and/or the prompt generation computer system 202, respectively, on the client computing device 208.

The network 212 can be any of a variety of networks over which computing devices can communicate. For instance, the network 212 can include a LAN, a WAN, a VPN, a wireless network, the Internet, a point-to-point network, a telephone network (e.g., public switched telephone network (PSTN)), a cellular telephone network, a 3G/4G network, or any combination thereof.

The content server system 204 can be any of a variety of computing devices, such as a desktop computer, a laptop computer, a distributed computer server system, a dedicated computer server system, and/or a collocated computer server system. The content server system 204 is configured to serve requested content to various computing devices, such as the client computing device 208. The content server system 204 can be configured to serve a variety of content, search queries, electronic documents, and/or social network information. For example, the content server system 204 can be a search engine. In another example, the content server system 204 can be a social network system.

The content server system 204 includes an I/O interface 218, which can be similar to the I/O interface of the client computing device 208. The content server system 204 also includes a content request processing module 220 that is configured to serve requests for content, such as search queries and/or requests for pages of a social network. The content request processing module 220 can be configured to store information associated with various received and processed requests. For example, the content request processing module 220 can log search queries received from the client computing device 208 in the corpus 206. In another example, the content request processing module 220 can store content (e.g., comments, posts, etc.) generated by users of a social network (e.g., requests to add new content to the social network) and/or log information regarding requests for content (e.g., a request for a profile page of another user of the social network).

The content request processing module 220 can store information in the corpus 206 in association with one or more languages 222 (e.g., English, Spanish, French, etc.) that are applicable to the information. For example, a search query received by the content server system 204 that is in English from an English language user can be stored in association with English in the corpus 206. In some implementations, separate corpora are used for each of the languages. A variety of additional details can be stored with the information in the corpus, such as a geographic region from which the information originated and/or a timestamp associated with the information.

The prompt generation computer system 202 can receive requests for generating speech prompts through the network 212 and an I/O interface 224 of the prompt generation computer system 202. The I/O interface 224 can be similar to the I/O interfaces 210 and 218. Requests for speech prompts generation can be received from the client computing device 208 and/or from other computing devices. For example, the prompt generation computer system 202 can be configured to provide a speech prompts service to end-users (e.g., serve web pages with speech prompts), such as the client computing device 208. In another example, the prompt generation computer system 202 can be configured to provide speech prompts to another computer system that is configured to serve such information to end-users, such as the content server system 204.

The prompt generation computer system 202 includes a speech analyzer 226 that is programmed to analyze a speech sample for an user of the client computing device 208 to determine characteristics of the user's voice, such as tone, pitch, vocal tract length, and/or accent. The prompt generation computer system 202 can generate speech prompts based on such characteristic information for a user's voice and existing speech data in a repository of previously recorded speech data 223. The repository of previously recorded speech data 223 can be similar to the recorded speech training data 112 discussed above with regard to FIG. 1. A speech sample from a user of the client computing device 208 can be received by the prompt generation computer system 202 over the network 212.

The prompt generation computer system 202 also includes an acoustic environment analyzer 228 that is programmed to analyze an audio sample from the client computing device 208 to identify an acoustic environment of the client computing device 208, such as a cell phone connection, a landline telephone connection, and/or a high level of background noise. Speech prompts can be generated by the prompt generation computer system 202 based on the identified acoustic environment and existing speech data in a repository of previously recorded speech data 223.

The prompt generation computer system 202 can further include a corpora frequency module 230 that is programmed to determine frequencies of occurrence for linguistic features of various languages in portions the one or more corpora 206 that are associated with the various languages 222. The corpora frequency module 230 can determine frequencies of occurrence similar to the determination of frequencies of occurrence described above with regard to the prompt generation computer system 100 and step B (104). The prompt generation computer system 202 can also include a recorded speech data statistics module 232 that is programmed to identify statistics for linguistic features in the repository of previously recorded speech data 223. The recorded speech data statistics module 232 can identify statistics for linguistic features similar to the statistics for linguistic features described above with regard to the prompt generation computer system 100 and step C (110). A weighting module 234 of the prompt generation computer system 202 can weight the frequency of occurrences information determined by the corpora frequency module 230 based on the statistic information identified by the recorded speed data statistics module 232. The weighting module 234 can weight the frequency of occurrence information similar to the weighting discussed above with regard to the prompt generation computer system 100 and step D (116).

The prompt generation computer system 202 can also include a textual prompt generator 238 that is programmed to generate textual speech prompts (e.g., scripts, scenarios) based on the frequency information determined by the corpora frequency module 230, the statistic information identified by the recorded speech data statistics module 232, and/or the weighted frequency of occurrence information determined by the weighting module 234. Similar to the discussion above with regard to the prompt generation computer system 100 and step E (120), the textual prompt generator 238 can generate textual speech prompts using a grammar checker 240 that is programmed to verify and/or correct the grammatical structure of combinations of linguistic features for various languages and/or using a spell checker 242 that is programmed to verify and/or correct the spelling the text resulting from combinations of linguistic features.

Each of the components 226-242 of the prompt generation computer system 202 can be implemented in hardware (e.g., application specific integrated circuits (ASICs)), software, and/or firmware.

The prompt generation computer system 202 can provide textual speech prompts generated by the textual prompt generator 238 to one or more other computing devices, such as the client computing device 208 and/or the content server system 204, and/or can store textual speech prompts generated by the textual prompt generator 238.

Figure 3:
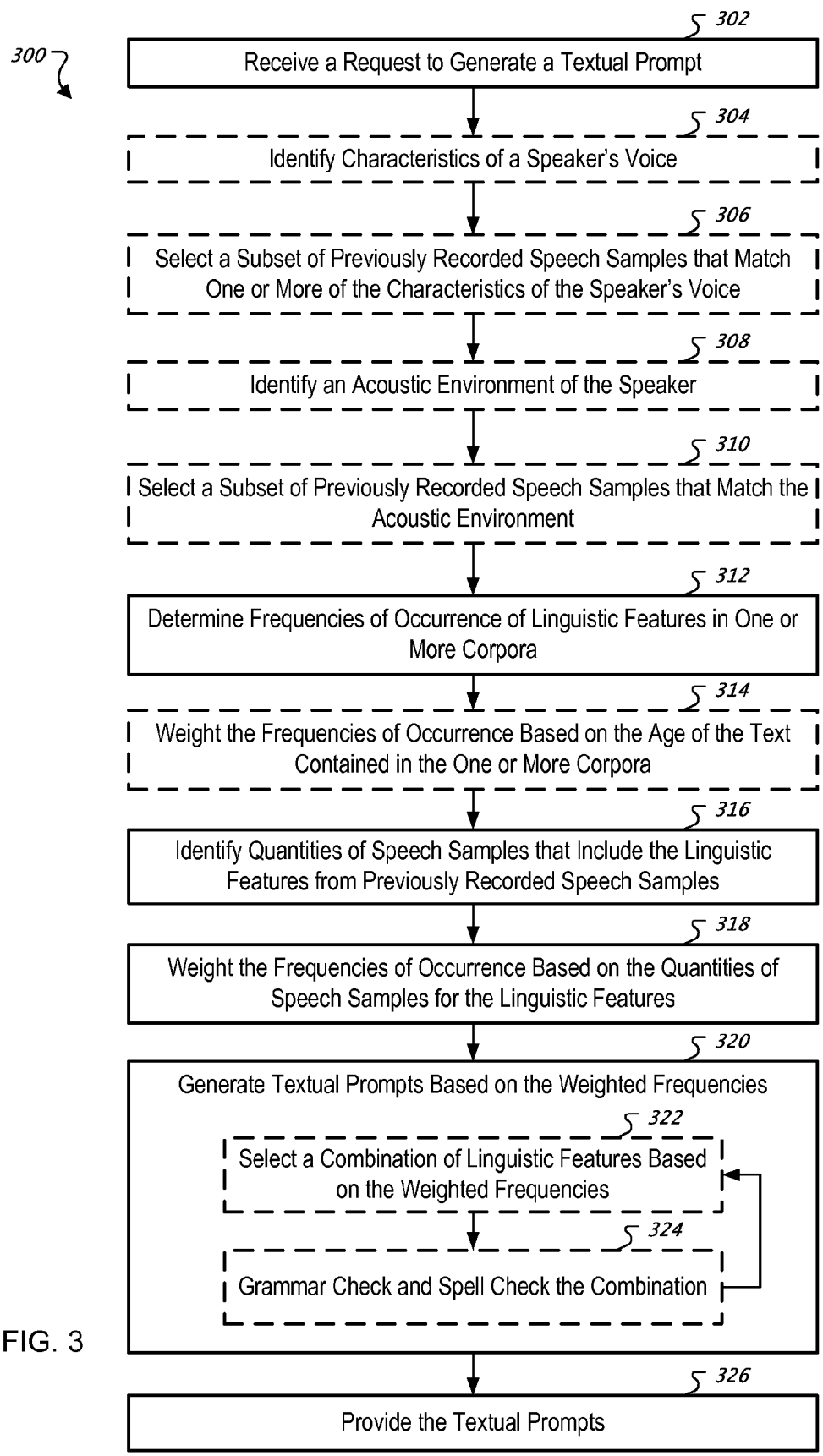
FIG. 3 depicts an example method for generating textual speech prompts.

FIG. 3 depicts an example method 300 for generating textual speech prompts. The method 300 can be performed by any of a variety of computing devices/systems, such as the prompt generation computer system 100 and/or the prompt generation computer system 202 described above with regard to FIGS. 1 and 2, respectively.

A request to generate a textual prompt can be received (302). For example, the prompt generation computer system 100 can receive the request to generate speech prompts at step A (102).

In some implementations, characteristics of the speakers voice can be identified (304) and a subset of previously recorded speech samples that match one or more characteristics of the speaker's voice can be selected (306). For example, the speech analyzer 226 of the prompt generation computer system 202 can identify one or more characteristics of a speaker's voice and the recorded speech data statistics module 232 can select a subset of the speech samples from the repository of previously recorded speech data 223 that match (within a threshold tolerance) one or more characteristics of the speaker's voice to use for generating statistics.

In some implementations, an acoustic environment of the speaker can be identified (308) and a subset of previously recorded speech samples that match the acoustic environment can be selected (310). For example, the acoustic environment analyzer 228 of the prompt generation computer system 202 can an acoustic environment for a speaker and the recorded speech data statistics module 232 can select a subset of the speech samples in the repository of previously recorded speech data 223 that match (within a threshold tolerance) the identified acoustic environment to use for generating statistics.

Frequencies of occurrence in one or more corpora of linguistic features in a particular language can be determined. For example, the corpora frequency module 230 of the prompt generation computer system 202 can determine frequencies of occurrence for linguistic features in a particular language using information stored in the corpus 206 that is associated with the particular language from among the languages 222. In some implementations, the frequencies of occurrence can be weighted based on the age of the text contained in the one or more corpora (314). For example, the corpora frequency module 230 can weight textual content based on associated timestamps for the textual content. Textual content that was more recently generated can be weighted more heavily than textual content that is older-newer textual content may more accurately reflect current language use than older textual content. The corpora frequency module 230 can aggregate occurrences of linguistic features across content included in one or more corpora, with occurrences in more recent content being weighted more heavily than occurrences in older content.

Quantities of speech samples (example statistics) that include the linguistic features can be identified from previously recorded speech samples (316). For example, the recorded speech data statistics module 232 can identify statistics for linguistic features from the repository of previously recorded speech data 223. In implementations where the characteristics of the speaker's voice for whom the textual prompts are being generated and/or the acoustic environment of the speaker are known or determined (e.g., steps 304-310), the statistics can be generated using a subset of the previously recorded speech samples that match (within a threshold value) one or more of the characteristics of the speaker's voice and/or the acoustic environment.

The frequencies of occurrence can be weighted based on the quantities of speech samples for the linguistic features (318). For example, the weighting module 234 can weight the frequencies of occurrence that are determined by the corpora frequency module 230 based on statistics generated by the recorded speed data statistics module 232.

Textual prompts can be generated based on the weighted frequencies of occurrence (320). For example, the textual prompt generator 238 can generated one or more textual speech prompts (e.g., scripts, scenarios) based on the weighted frequency of occurrence information determined by the weighting module 234. Such generation of textual prompts can additionally be made by, in some implementations, selecting combinations of linguistic features based on the weighted frequencies of occurrence (322) and performing grammar and spell checking on the combinations (324). For example, the textual prompt generator 238 can generate candidate textual prompts based on the weighted frequencies of occurrence and can use the grammar checker 240 and/or the spell checker 242 to verify and/or correct deficiencies in such candidate textual prompts. The steps 322 and 324 can be repeatedly performed until a sufficient number of textual prompts have been generated (e.g., at least the requested number of textual speech prompts) and/or until all combinations of linguistic features with at least a threshold weighted frequency value have been evaluated.

Generated textual prompts can be provided (326). For example, the prompt generation computer system 202 can provide generated textual prompts to the client computing device 208, to the content server system 204, and/or to a storage device that is not depicted in FIG. 2.

Figure 4:
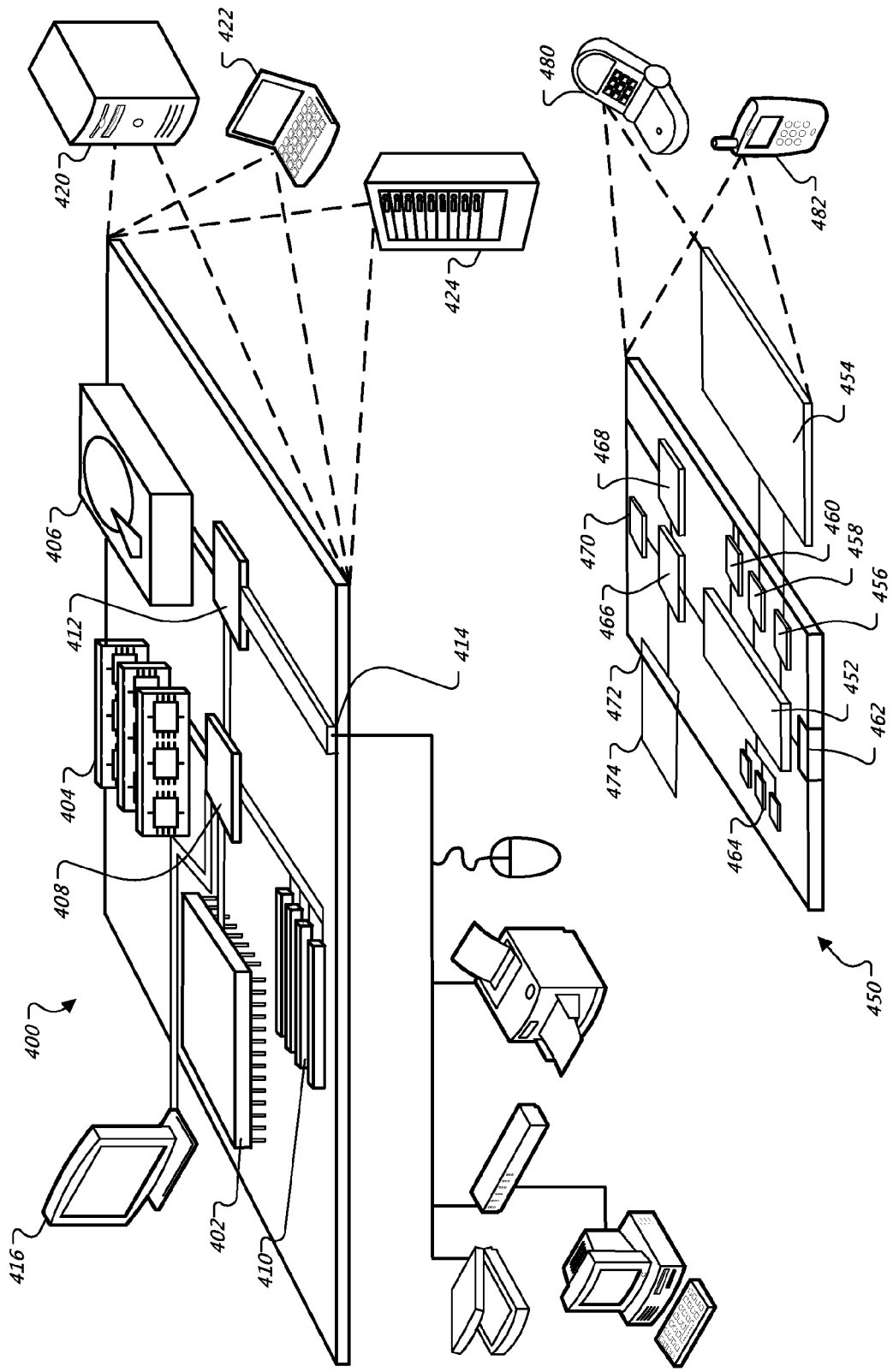
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, apparatus, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for generating speech data collection prompts may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, at a computer system, a request to generate a textual prompt to provide to a user for generating speech data in a particular language;
   in response to receiving the request, determining frequencies of occurrence of linguistic features of the particular language in one or more corpora that are associated with the particular language, wherein the one or more corpora include content that was generated by people who use the particular language and that reflects current use of the particular language;
   identifying, by the computer system, quantities of speech samples that include the linguistic features from a repository of previously recorded speech samples;
   weighting the frequencies of occurrence of the linguistic features based on the quantities of speech samples that include the linguistic features, wherein the weighting generates weighted frequencies for the linguistic features, wherein a first linguistic feature is determined to have a weighted frequency that is greater than a weighted frequency for a second linguistic feature as a result of the computer system executing computer code that includes both of the following conditions and determining that one or more of the following conditions are satisfied:
(i) the first linguistic feature has a same or greater frequency of occurrence in the one or more corpora and has fewer speech samples in the repository of previously recorded speech samples than the second linguistic feature, and
(ii) the first linguistic feature has a greater frequency of occurrence in the one or more corpora and has the same or fewer speech samples in the repository of previously recorded speech samples than the second linguistic feature;
generating, by the computer system, one or more textual prompts based on the weighted frequencies for the linguistic features, wherein each of the one or more textual prompts comprises a combination of two or more of the linguistic features; and
providing, by the computer system, the generated one or more textual prompts.

2. The computer-implemented method of claim 1, wherein the request identifies a particular user to whom the request pertains;
the method further comprising:
identifying, by the computer system, one or more characteristics of the particular user's voice from a speech sample for the particular user; and
selecting, from the repository of previously recorded speech samples, a subset of the previously recorded speech samples that include voices that have one or more characteristics that match, within a threshold value, the one or more characteristics of the particular user's voice;
wherein the quantities of speech samples are identified from the subset of the repository of previously recorded speech samples.

3. The computer-implemented method of claim 2, wherein the one or more characteristics of the particular user's voice include one or more of: a pitch of the particular user's voice, a vocal tract length of the particular user's voice, an accent of the particular user with which the particular user speaks, and a cadence with which the particular user speaks.

4. The computer-implemented method of claim 2, wherein the generated one or more textual prompts are provided to a computing device that is associated with the particular user.

5. The computer-implemented method of claim 1, wherein the request identifies a particular acoustic environment to which the request pertains;
the method further comprising:
selecting, from the repository of previously recorded speech samples, a subset of the previously recorded speech samples that were recorded in acoustic environments that match, within a threshold value, the particular acoustic environment;
wherein the quantities of speech samples are identified from the subset of the repository of previously recorded speech samples.

6. The computer-implemented method of claim 5, wherein the particular acoustic environment comprises a mobile telephone device into which a user is speaking and from which audio signals are being received.

7. The computer-implemented method of claim 1, wherein generating the one or more textual prompts comprises:
repeatedly performing the following until the one or more textual prompts have been generated:
selecting a combination of candidate linguistic features from the linguistic features based on the weighted frequencies; and
grammar checking and spell checking the combination of candidate linguistic features, wherein the combination of candidate linguistic features is identified as one of the one or more textual prompts when the combination of candidate linguistic features passes the grammar checking and the spell checking.

8. The computer-implemented method of claim 7, wherein the combination of candidate linguistic features are selected based on the candidate linguistic features having weighted frequencies that are at a threshold level or greater.

9. The computer-implemented method of claim 7, wherein the combination of candidate linguistic features are selected based on the candidate linguistic features having weighted frequencies that are greatest among the weighted frequencies for the linguistic features that have not yet been considered in combination together.

10. The computer-implemented method of claim 1, wherein the linguistic features include one or more of: phonemes, syllables, words, and phrases.

11. The computer-implemented method of claim 1, wherein the one or more textual prompts comprise one or more textual scripts that are generated for users to read aloud without modification when providing a speech sample.

12. The computer-implemented method of claim 1, wherein the one or more textual prompts comprise one or more scenarios that include incomplete information regarding the one or more scenarios so that users providing speech samples from the one or more scenarios ad lib at least a portion of the speech samples.

13. The computer-implemented method of claim 1, wherein the one or more corpora include, at least, a corpus of search query logs that include user-generated search queries in the particular language.

14. The computer-implemented method of claim 1, wherein the one or more corpora include, at least, a corpus of electronic documents that include text in the particular language.

15. The computer-implemented method of claim 1, wherein the one or more corpora include, at least, a corpus of user-generated textual content on one or more social networks, the user-generated textual content being in the particular language.

16. The computer-implemented method of claim 1, wherein the one or more corpora includes information that identifies amounts of time that have elapsed since portions of the content were added to the one or more corpora, and wherein the frequencies of occurrence of the linguistic features are weighted further based on the amounts of time.

17. The computer-implemented method of claim 1, further comprising selecting the one or more corpora from among a plurality of corpora based on amounts of time that have elapsed since portions of the content were added to the one or more corpora.

18. A computer system comprising:
one or more computing devices;
an interface of the one or more computing devices that is programmed to receive requests to generate a textual prompt to provide to a user for generating speech data in a particular language;
one or more corpora that are accessible to the one or more computing devices and that include content that was generated by people who use the particular language and that reflects current use of the particular language;

a frequency module that is installed on the one or more computing devices and that is programmed to determine frequencies of occurrence of linguistic features of the particular language in the one or more corpora;

a repository of previously recorded speech samples that are accessible to the one or more computing devices and that is separate from the one or more corpora;

a quantity module that is installed on the one or more computing devices and that is programmed to identify quantities of speech samples that include the linguistic features from the repository of previously recorded speech samples;

a weighting module that is installed on the one or more computing devices and that is programmed to weight the frequencies of occurrence of the linguistic features based on the quantities of speech samples that include the linguistic features, wherein the weighting generates weighted frequencies for the linguistic features; and a textual prompt generator that is installed on the one or more computing devices and that is programmed to generate one or more textual prompts based on the weighted frequencies for the linguistic features, wherein each of the one or more textual prompts comprises a combination of two or more of the linguistic features, wherein the weighting module is further programmed to generate a weighted frequency for a first linguistic feature that is greater than a weighted frequency for a second linguistic feature as a result of executing computer code that includes both of the following conditions and determining that one or more of the following conditions are satisfied: (i) the first linguistic feature has a same or greater frequency of occurrence in the one or more corpora and has fewer speech samples in the repository of previously recorded speech samples than the second linguistic feature, and (ii) the first linguistic feature has a greater frequency of occurrence in the one or more corpora and has the same or fewer speech samples in the repository of previously recorded speech samples than the second linguistic feature.

19. A computer program product embodied in a non-transitory computer-readable storage device storing instructions that, when executed, cause a computer system with one or more processors to perform operations comprising:

receiving a request to generate a textual prompt to provide to a user for generating speech data in a particular language;

in response to receiving the request, determining frequencies of occurrence of linguistic features of the particular language in one or more corpora that are associated with the particular language, wherein the one or more corpora include content that was generated by people who use the particular language and that reflects current use of the particular language;

identifying quantities of speech samples from a repository of previously recorded speech samples that include the linguistic features;

weighting the frequencies of occurrence of the linguistic features based on the quantities of speech samples that include the linguistic features, wherein the weighting generates weighted frequencies for the linguistic features, wherein a first linguistic feature is determined to have a weighted frequency that is greater than a weighted frequency for a second linguistic feature as a result of executing computer code that includes both of the following conditions and determining that one or more of the following conditions are satisfied:

(i) the first linguistic feature has a same or greater frequency of occurrence in the one or more corpora and has fewer speech samples in the repository of previously recorded speech samples than the second linguistic feature, and (ii) the first linguistic feature has a greater frequency of occurrence in the one or more corpora and has the same or fewer speech samples in the repository of previously recorded speech samples than the second linguistic feature;

generating one or more textual prompts based on the weighted frequencies for the linguistic features, wherein each of the one or more textual prompts comprises a combination of two or more of the linguistic features; and providing the generated one or more textual prompts.

* * * * *